United States Patent [19]
Takatori et al.

[11] Patent Number: 5,664,069
[45] Date of Patent: Sep. 2, 1997

[54] DATA PROCESSING SYSTEM

[75] Inventors: Sunao Takatori; Ryohei Kumagai; Koji Matsumoto; Makoto Yamamoto, all of Tokyo, Japan

[73] Assignees: Yozan, Inc., Tokyo; Sharp Corporation, Osaka, both of Japan

[21] Appl. No.: 447,775

[22] Filed: May 23, 1995

Related U.S. Application Data

[62] Division of Ser. No. 549,748, Jul. 9, 1990, Pat. No. 5,463,717.

[30] Foreign Application Priority Data

Jul. 10, 1989 [JP] Japan .................. 1-178377
Aug. 10, 1989 [JP] Japan .................. 1-207220

[51] Int. Cl.⁶ .................................................. G06F 15/18
[52] U.S. Cl. ............................................. 395/211; 395/22
[58] Field of Search .................. 395/24, 22, 21; 382/158

[56] References Cited

U.S. PATENT DOCUMENTS

| | | | |
|---|---|---|---|
| 2,065,280 | 12/1936 | Koros et al. | 327/365 X |
| 2,538,500 | 1/1951 | Bess | 326/111 |
| 2,712,065 | 6/1955 | Elbourne et al. | 326/111 |
| 2,785,305 | 3/1957 | Crooks et al. | 326/111 X |
| 2,798,156 | 7/1957 | Selmer | 326/111 X |
| 2,808,990 | 10/1957 | Allen | 364/846 X |
| 2,820,897 | 1/1958 | Dean et al. | 326/111 |
| 2,824,697 | 2/1958 | Pittman et al. | 364/838 X |
| 2,901,605 | 8/1959 | Raymond et al. | 326/111 X |
| 2,934,271 | 4/1960 | Kessel | 326/111 X |
| 2,934,706 | 4/1960 | Johnson et al. | 326/111 X |
| 2,941,722 | 6/1960 | Van Allen | 364/846 |
| 2,943,791 | 7/1960 | Henle et al. | 364/777 |
| 2,981,473 | 4/1961 | Goto | 364/846 |
| 3,021,440 | 2/1962 | Anderson | 327/368 |

(List continued on next page.)

FOREIGN PATENT DOCUMENTS

| | | | |
|---|---|---|---|
| 1158507 | 6/1958 | France | 364/777 |
| 896413 | 5/1962 | United Kingdom | 364/777 |

OTHER PUBLICATIONS

An Introduction to Computing with Neural Nets; Lippmann; IEEE ASSP Magazine; Apr. 1987; pp. 4–22.

A Magnetic Power and Communication Interface for a CMOS Integrated Circuit; Glasser et al; IEEE J. of Solid-State Circuits; vol. 24, No. 4; Aug. 1989; pp. 1146–1149.

A Magnetic Power and Communication Interface for a CMOS Die; Malamy et al; IEEE Inter. Solid-State Circuits Conf.; pp. 264, 265, 398, 399; 1988.

A. Weiss and H. Nawab, "A Representation for the Orientation-Dependent Appearance of 3-D Objects," Int'l. Conf. on Acoustics, Speech & Signal Processing, pp. 956–959. Apr. 1988.

N.M. Allinson, "Connectionist Techniques for Signal Processing," IEE Colloq. No. 042: The Application of Artificial Intelligence ..., pp. 3/1–3/3. Mar. 1989.

R. Linsker, "From basic network principles to neural architecture: Emergence of orientation columns," Proc. Natl. Acad. Sci., pp. 8779–8783. Nov. 1986.

(List continued on next page.)

*Primary Examiner*—Robert W. Downs
*Attorney, Agent, or Firm*—Cushman, Darby & Cushman IP Group of Pillsbury Madison & Sutro LLP

[57] ABSTRACT

A data processing system including a plurality of neural layers characterized in that each neural layer is divided into a plurality of groups and that neurons in one of the group in one layer are connected only with neurons in corresponding group of adjacent layers, whereby independent neural cells are constructed each of which comprises corresponding groups of neurons. The minimum number of neural layers is equal to the difference between the degree of abstraction of an output data and the degree of abstraction of an input data.

8 Claims, 10 Drawing Sheets

U.S. PATENT DOCUMENTS

| | | | |
|---|---|---|---|
| 3,247,366 | 4/1966 | Tiemann | 364/838 X |
| 3,250,918 | 5/1966 | McGrogan | 395/24 |
| 3,302,038 | 1/1967 | Wine | 327/372 |
| 3,351,773 | 11/1967 | Wolf et al. | 395/24 |
| 3,353,105 | 11/1967 | Allmark et al. | 326/104 |
| 3,383,500 | 5/1968 | Ernst | 364/846 X |
| 3,571,918 | 3/1971 | Haberecht | 29/577 |
| 3,691,400 | 9/1972 | Askew | 395/24 |
| 3,765,082 | 10/1973 | Zyetz | 29/602 |
| 4,297,647 | 10/1981 | Akiyama et al. | 330/307 |
| 4,322,698 | 3/1982 | Takahashi et al. | 333/184 |
| 4,543,553 | 9/1985 | Mandai et al. | 336/83 |
| 4,565,931 | 1/1986 | Furney | 307/262 |
| 4,660,166 | 4/1987 | Hopfield | 395/24 |
| 4,719,591 | 1/1988 | Hopfield | 395/24 |
| 4,731,747 | 3/1988 | Denker | 395/24 |
| 4,771,247 | 9/1988 | Jacomb-Hood | 330/277 |
| 4,941,122 | 7/1990 | Weideman | 395/22 |
| 5,058,184 | 10/1991 | Fukushima | 395/24 |
| 5,060,278 | 10/1991 | Fukumizu | 395/22 |
| 5,195,171 | 3/1993 | Takatori et al. | 395/24 |
| 5,371,835 | 12/1994 | Akamatsu et al. | 395/24 |
| 5,553,196 | 9/1996 | Takatori et al. | 395/24 |

OTHER PUBLICATIONS

D. Ballard, "Modular Learning in Neural Networks," Proc. Sixth National Conference on Artificial Intelligence, pp. 279–284. Jul. 1987.

P. Mueller, et al., "Neural Computation of Visual Images," from Proc. IEEE 1st Annual Int'l. Conf. on Neural Networks, IV, pp. 75–88. Jun. 1987.

K. Fukushima, "Self–organizing Neural Network Models for Visual Pattern Recognition," Acta Neurochirurgica, pp. 51–67. Dec. 1987.

K. Fukushima, "A Neural Network for Visual Pattern Recognition," IEEE Computer, pp. 65–75. Mar. 1988.

R. Linsker, "Self–organization in a Perceptual Network," IEEE Computer, pp. 105–117. Mar. 1988.

J. Templeman, "Race Networks: A Theory of Competitive Recognition Networks based on the Rate of Reactivation of Neurons in Cortical Columns", IEEE Int'l. Conf. on Neural Networks, pp. II–9 to II–16. Jul. 1988.

F. Guyot, et al., "Toward a Continuous Model of the Cortical Column: Application to Speech Recognition," ICASSP '89: Acoustics, Speech & Signal Processing Conf., pp. 37–40. May 1989.

C. Cortes, "A Network System for Image Segmentation, " Int'l. Joint Conf. on Neural Networks , pp. I–121 to I–125. Jun. 1989.

DATA PROCESSING SYSTEM

This is a division of application Ser. No. 07/549,748 filed Jul. 9, 1990, now U.S. Pat. No. 5,463,717.

FIELD OF THE INVENTION

The present invention relates to a data processing system based on a concept of neural network.

Figure 11:
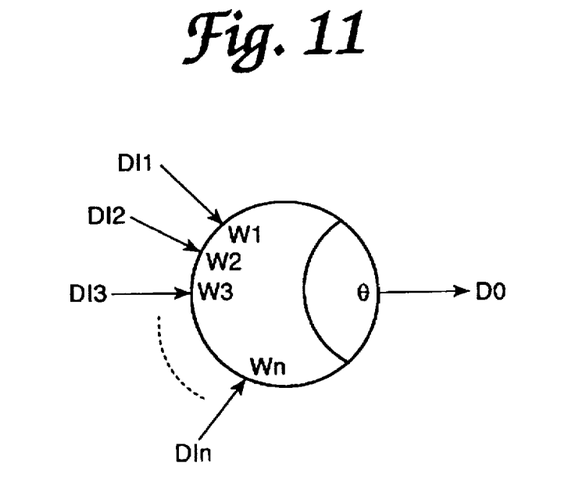
FIG. 11 shows a schematic diagram indicating neuron model.
Figure 12:
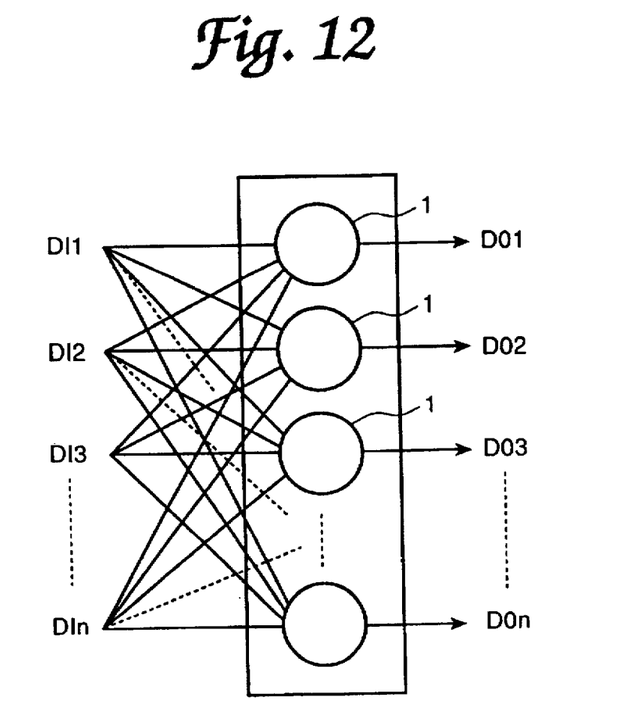
FIG. 12 shows a schematic diagram indicating the example of neural layer.

A neural network for such data processing system is organized by arranging neuron models (hereafter, called "neuron") 1 shown in FIG. 11, in parallel as shown in FIG. 12.

Data D0 is output according to the comparison result between the sum of multiplied input data and threshold θ. Data input from outside DI1, DI2, DI3, ... DIn, are multiplied by weights W1, W2, W3, ... Wn, respectively. Various comparison manners are possible. For example: it is determined that;

an output data DO becomes "1" when the sum is more than or equal to threshold θ, and an output data Do becomes "0" when said sum is smaller than threshold θ.

A neural network is constructed by connecting a neural layer in series, while the neural layer is constructed by arranging neurons in parallel. Conventionally, there was not established theory for the construction of neural network. Usually, following to perceptron proposed by Rosenblatt, a neural network is constructed with 3 layers consisting of as many neurons as the number of data inputted.

Therefore, it has never been clarified the correlation between data processing to be performed by a neural network and the structure of the neural network. The evaluation cannot be made whether constructed neural network can accomplish expected object or not, until the neural network is experimented.

As for a neuron which is the component of the neural network, it is not so difficult to realize Macalloch-Pitts model by a digital circuit. Macalloch-Pitts model handles normalized digital signal as an output, as shown in the following formula.

$$\phi \left[ \left( \sum_i wiAi \right) - \theta \right]$$

where,

φ: normalizing function, wi: weight of i-th synapse,

Ai: input to i-th synapse,

θ: threshold for neuron.

However, rather large circuits are necessary for the calculation including multiplications, so it is difficult to construct a large scale neural network due to circuitry limit of ICs.

It is suggested an attempt to construct neural network by analog circuit in U.S. Pat. No. 4,660,166, No. 4,719,591 and No. 4,731,747.

The neural network disclosed in these issues have the structure to control by means of variable resistance inputs of operation amplifiers, each of which is connected to all other amplifiers in order to evaluate the energy formula below.

$$E = (1/2 \sum_i \sum_j TijViVj + \Sigma(Ii/Ri) \int_{-\infty}^{Vi} g^{i-1}(V)dV - \sum_i IiVi$$

The neural network suggested here is effective to calculate the minimum and maximum in variables given by the function equivalent to the formula above. It is used to solve the problem of traveling salesman, for example.

Such neural network lacks, however, the function to output digital value with normalization, that is, according to a compression with threshold. It cannot realize the function of neural network of organisms for information compression, integration and approximation. Therefore, the most advantageous characteristics of a neural network cannot be obtained by the above construction; that is, the improvement and associative convention of an input pattern cannot be performed.

SUMMARY OF THE INVENTION

The present invention is invented so as to solve the above problems of the prior art and has an object to provide a data processing system capable of executing objective data processing without fail.

The present invention has an object to provide a data processing system as an integrated circuit with a function of normalizing.

A data processing system according to the present invention is characterized in that;

the number of neural layers is equal to the number with respect to the abstraction difference between output data and input data, and at least 2 neural layers are divided into a plurality of neural cells which includes at least one neuron, and a neuron included in each neural cell is not connected to the neuron of other neural cell.

A data processing system according to the present invention includes a resonance system for inputting which is connected to a switching circuit and is driven by a plurality of resonance systems for outputting. It realizes the function of normalization by the breaking performance of switching circuit.

PREFERRED EMBODIMENT OF THE PRESENT INVENTION

Hereinafter, an embodiment of the data processing system according to the present invention is described with referring to the attached drawings.

Figure 1:
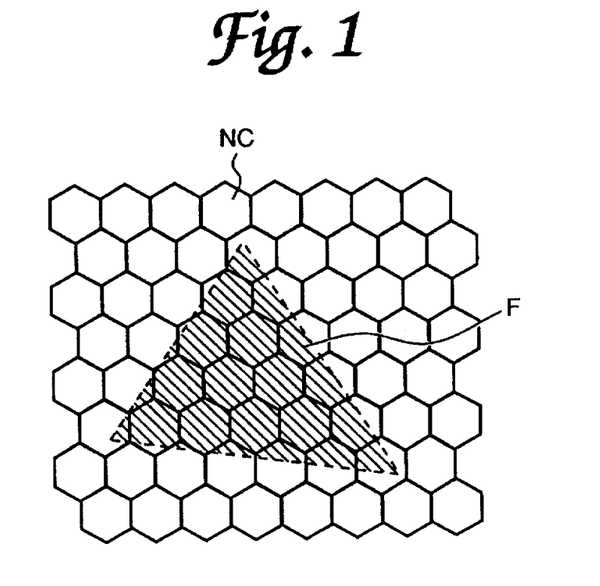
FIG. 1 shows a schematic diagram of an embodiment of a data processing system including neural cells, according to the present invention.

As shown in FIG. 1, the data processing system consists of a plurality of neural cells NC each of which is formed into a hexagon so that a honeycomb structure is constructed as a whole.

In general, an image is processed after it is divided into a plurality of unit areas. Here, a unit area is square or rectangle area such as 3×3 pixels' area. Although the form of above unit area is resulted from such performance of a hardware that an image is scanned along horizontal scan lines. The most preferable form of unit area is the one whose peripheral touches under equivalent conditions to adjacent unit areas. The honeycomb structure will provide the best processing condition by means of the above preference. It is possible to setup such preferable unit area, because the structure of neural layer can be set up independently from a hardware for scanning an image. According to the above, it is possible to optimize processing manner by setting up a unit area at neural network side rather than input system.

A binary data is input to a data processing system through input system (not shown). As shown in FIG. 1, a triangle figure F is input to the data processing system.

Figure 2:
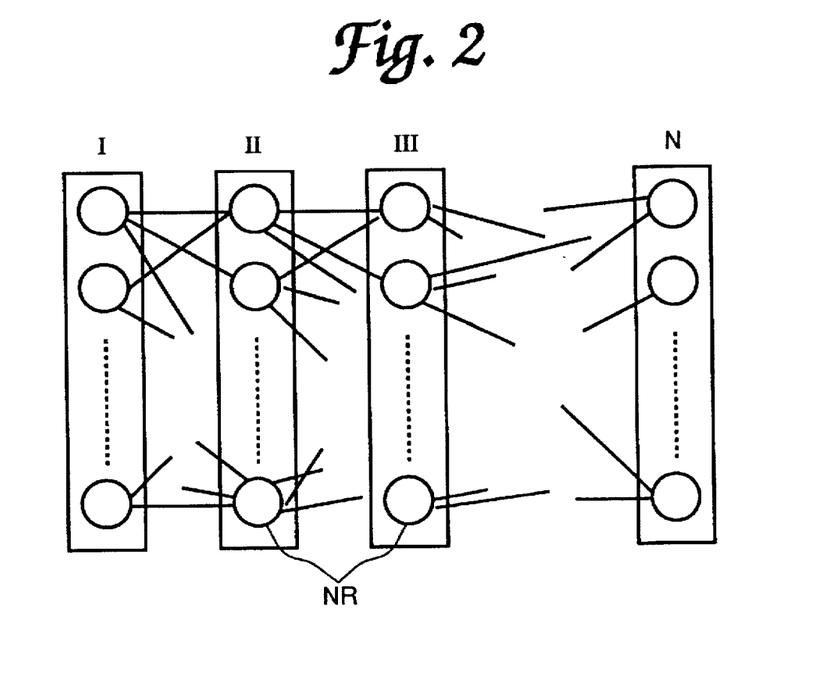
FIG. 2 shows a schematic diagram including layers of above neural cell.
Figure 3:
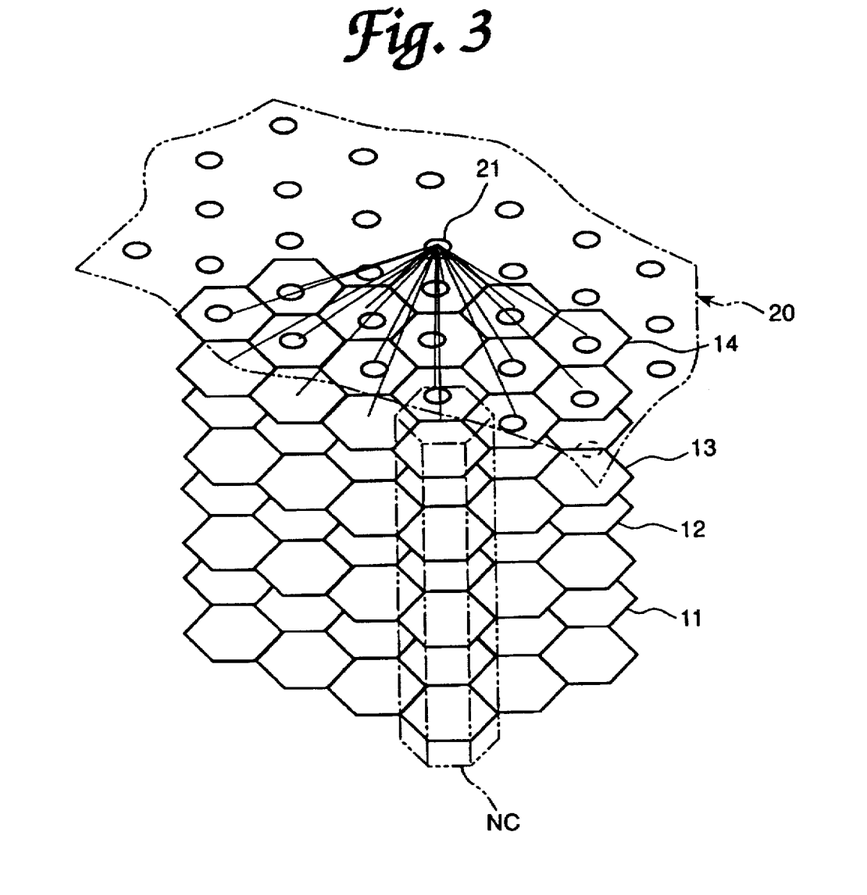
FIG. 3 shows a schematic diagram indicating the structure of a neural cell and the structure of a neural layer for the following processing.

Each neural cell is composed by a plurality of neural layers (FIG. 2), each of which is constructed by arranging a plurality of neurons N in parallel. A structure of a neural cell is described in FIG. 2. According to the above embodiment, a neuron NR of each neural layer is connected with all neurons of an adjacent neural layer. Input data is processed by neural layers, successively, so as to obtain the final output, wherein the output of nth neural layer is the input of (n+1)th neural layer. FIG. 3 schematically shows neural cells of neural layers 11, 12, 13 and 14 and typical relationship between a neural cell and the following neural layer 20. In FIG. 3 each of neural layers 11, 12, 13 and 14 is divided into hexagonal neural cells NC. That is, a neural cell includes a plurality of neural layers 11, 12, 13 and 14, and a large number of neurons are included in each neural layer. Neurons are connected with one another only within a neural cell and neurons belonging to another neural cells are never connected with each other. According to the above, each neural cell NC is not connected with each other so that data transmission is only performed inside each neural cell, individually. It is also possible to construct a neural cell. Preparing of a neural cell NC for 2 neural layers is acceptable.

A data processing system is able to furnish with the objective processing function by learning. Hereinafter, performance of simple recognition of geometrical figure is described.

Figure 4:
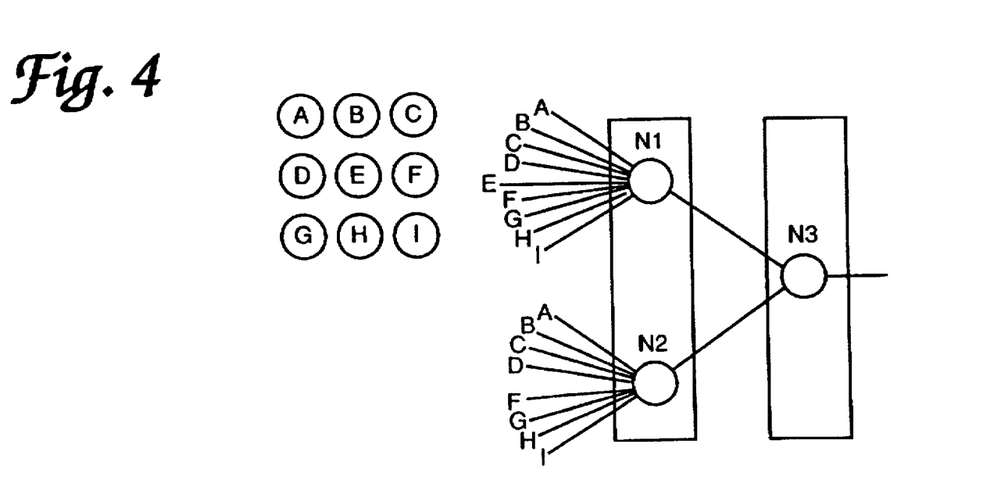
FIG. 4 shows a schematic diagram indicating the edge extraction processing system according to the above neural cell.

An embodiment of a neural layer for the performance of edge extraction is shown in FIG. 4. Neurons A to I corresponding to 3×3 convolution are shown in FIG. 4, in which neuron outputs "1" with respect to the input with high brightness value. When outputs of neurons A to I are deemed to be A to I, existence of edges except isolate points can be described by logical formula as follows:

$$E(\overline{A+B+C+D+F+G+H+I} \times) (A+B+C+D+F+G+H+I)=1 \qquad (1)$$

Outputs A to I are input to neuron N1, and outputs A to D, and F to I are input to neuron N2. Then, outputs from neuron N1 and N2 are input to neuron N3. Here, weights for neuron N1 to N3 and thresholds are set up as shown in Table 1 to 3, as one example.

TABLE 1

| Weight and threshold for neuron N1 | | |
| --- | --- | --- |
| Weight with respect to output A | W1A | −1 |
| Weight with respect to output B | W1B | −1 |
| Weight with respect to output C | W1C | −1 |
| Weight with respect to output D | W1D | −1 |
| Weight with respect to output E | W1E | 9 |
| Weight with respect to output F | W1F | −1 |
| Weight with respect to output G | W1G | −1 |
| Weight with respect to output H | W1H | −1 |
| Weight with respect to output I | W1I | −1 |
| Theshold | θ1 | 0.5 |

TABLE 2

| Weight and threshold for neuron N2 | | |
| --- | --- | --- |
| Weight with respect to output A | W2A | 1 |
| Weight with respect to output B | W2B | 1 |
| Weight with respect to output C | W2C | 1 |
| Weight with respect to output D | W2D | 1 |
| Weight with respect to output E | W2E | 1 |
| Weight with respect to output F | W2F | 1 |
| Weight with respect to output G | W2G | 1 |
| Weight with respect to output H | W2H | 1 |
| Weight with respect to output I | W2I | 1 |
| Theshold | θ2 | 0.5 |

TABLE 3

| Weight and threshold for neuron N3 | | |
| --- | --- | --- |
| Weight with respect ot output N1 | W3N1 | 1 |
| Weight with respect to output N2 | W2N2 | 1 |
| Threshold | θ | 1.5 |

Here, neuron N1 performs the processing according to;

$E \; (\overline{A} + \overline{B} + \overline{C} + \overline{D} + \overline{F} + \overline{G} + \overline{H} + \overline{I})$         (2)

Neuron N2 performs the processing according to;

$A + B + C + D + F + G + H + I$         (3)

On the other hand, neuron N3 performs the processing according to AND logic of above formulas (2) and (3).

Therefore, neuron N3 outputs "1" when the edge of a configuration is projected to neuron E.

Figure 5:
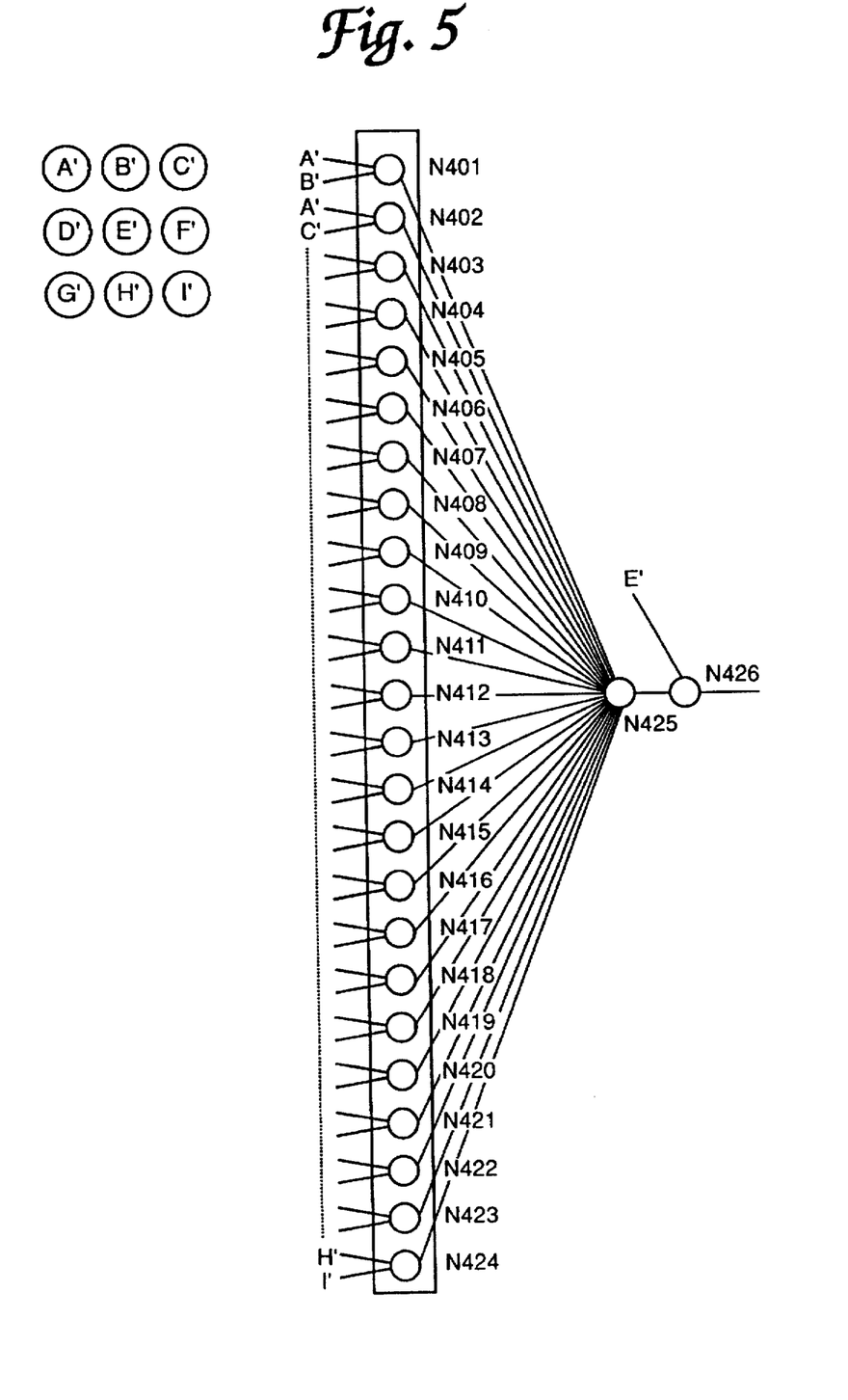
FIG. 5 shows a schematic diagram indicating the corner extraction processing system according to the above neural cell.

Hereinafter, an neural network which performs corner extraction is described according to FIG. 5. Here, input of this neural network is an output of neuron N3 of FIG. 4. In FIG. 5, neuron N3 according to neuron A to I is expressed as A' to I'. The logic formula (4) for extracting the corner is shown as follows:

$E' \; (A'B' + A'C' + A'D' + A'F' + A'G' + A'H' + B'C' + B'D' + B'F' + B'G' + B'T' + C'D' + C'F' + C'H' + C'T' + D'G' + D'H' + D'T' + F'G' + F'H' + F'T' + G'H' + G'T' + H'T') = 1$   (4)

Neurons N401 to N424 and N425 are prepared for this processing. Output A' to D' and F' to I' are input to neuron N401 to N424 with respect to the combinations shown in Table 4, and weights and threshold for the above input are shown as follows:

TABLE 4

| Neuron | Weight | Input | Threshold |
|---|---|---|---|
| N401 | A', B' | 1 | 1.5 |
| N402 | A', C' | 1 | 1.5 |
| N403 | A', D' | 1 | 1.5 |
| N404 | A', F | 1 | 1.5 |
| N405 | A', G' | 1 | 1.5 |
| N406 | A', H' | 1 | 1.5 |
| N407 | B', C' | 1 | 1.5 |
| N408 | B', D' | 1 | 1.5 |
| N409 | B', F | 1 | 1.5 |
| N410 | B', G' | 1 | 1.5 |
| N411 | B', I' | 1 | 1.5 |
| N412 | C', D' | 1 | 1.5 |
| N413 | C', F | 1 | 1.5 |
| N414 | C', H' | 1 | 1.5 |
| N415 | C', I' | 1 | 1.5 |
| N416 | D', G' | 1 | 1.5 |
| N417 | D', H' | 1 | 1.5 |
| N418 | D', I' | 1 | 1.5 |
| N419 | F, G' | 1 | 1.5 |
| N420 | F, H' | 1 | 1.5 |
| N421 | F, I' | 1 | 1.5 |
| M422 | G', H' | 1 | 1.5 |
| N423 | G', I' | 1 | 1.5 |
| N424 | H', I' | 1 | 1.5 |

Outputs N401 to N424 are input to N425, and weight and threshold for the above are shown in Table 5.

TABLE 5

| Neuron | Weight | Threshold |
|---|---|---|
| N401 ~ N424 | 1 | 1.5 |

This is equivalent to OR logic.

Furthermore, output of neuron N245 and E' are input to neuron N246, and weight and threshold for the above are shown in Table 6.

TABLE 6

| Neuron | Weight | Threshold |
|---|---|---|
| N245 | 1 | 1.5 |
| E | 1 | |

This is equivalent to AND logic.

Although setup of above weight is automatically performed by learning of a data processing system and optimized association can be obtained by appropriate learning, a high neuron efficiency can be obtained by an advanced artificial setup of layer in which each data is input. For example, a neural network with the same functions as FIG. 4 can be constructed(FIG. 6) by inputting of data E' to the first neural layer, together with A' to D' and F' to I', according to the neural network in FIG. 5. In this case, it is possible to reduce the number of layers by 1; however, extreme increase in number of connection lines, contrary to the above, as to increase the number of synapses of the first neural layer by 24. Since input E' according to the formula (4), is affected with respect to the result of logic operation (A' B'+ . . . ), input E' is considered to have the abstraction ratio at the same level of that of the result inside the parenthesis. Therefore, neuron efficiency can be improved by inputting layers corresponding to this abstraction ratio.

Here, the concept of degree according to abstraction ratio of data is implemented and following definitions are taken into the consideration:

1. By a processing of a single neural layer, degree is heightened by 1.
2. An input to the same neural layer is the one at the same degree.

Figure 6:
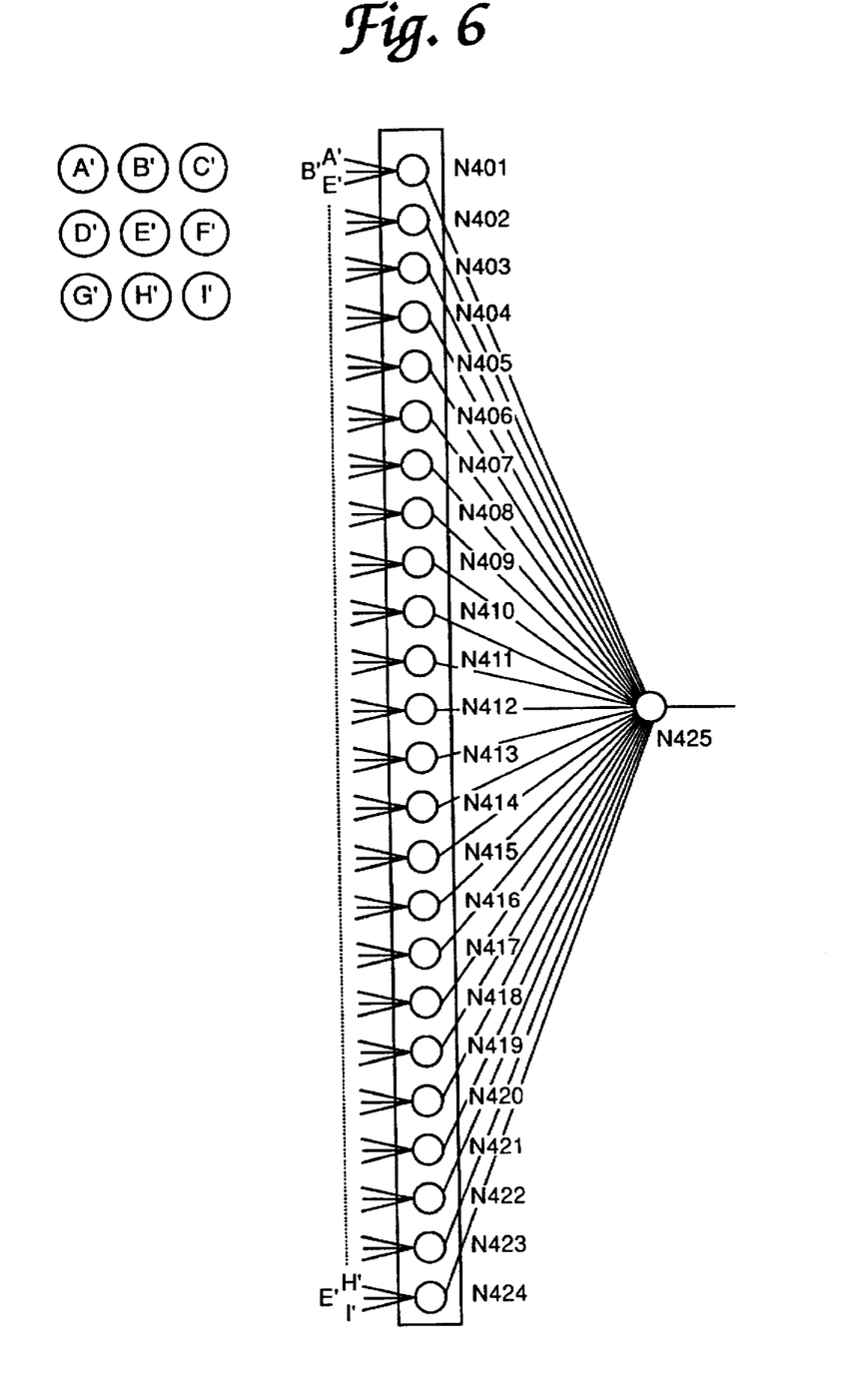
FIG. 6 shows a schematic diagram indicating the example of the transformation of FIG. 4.

According to the above definitions, 4 layers(in the case when the constructions in FIG. 4 and FIG. 6 are adapted) or 5 layers(in the case when the constructions in FIG. 4 and FIG. 5 are adapted) are necessary for corner extraction, and the degree of the final output becomes 4 or 5 degrees when degree of image data (the input to neurons A to I) is deemed to be 0.

Figure 7:
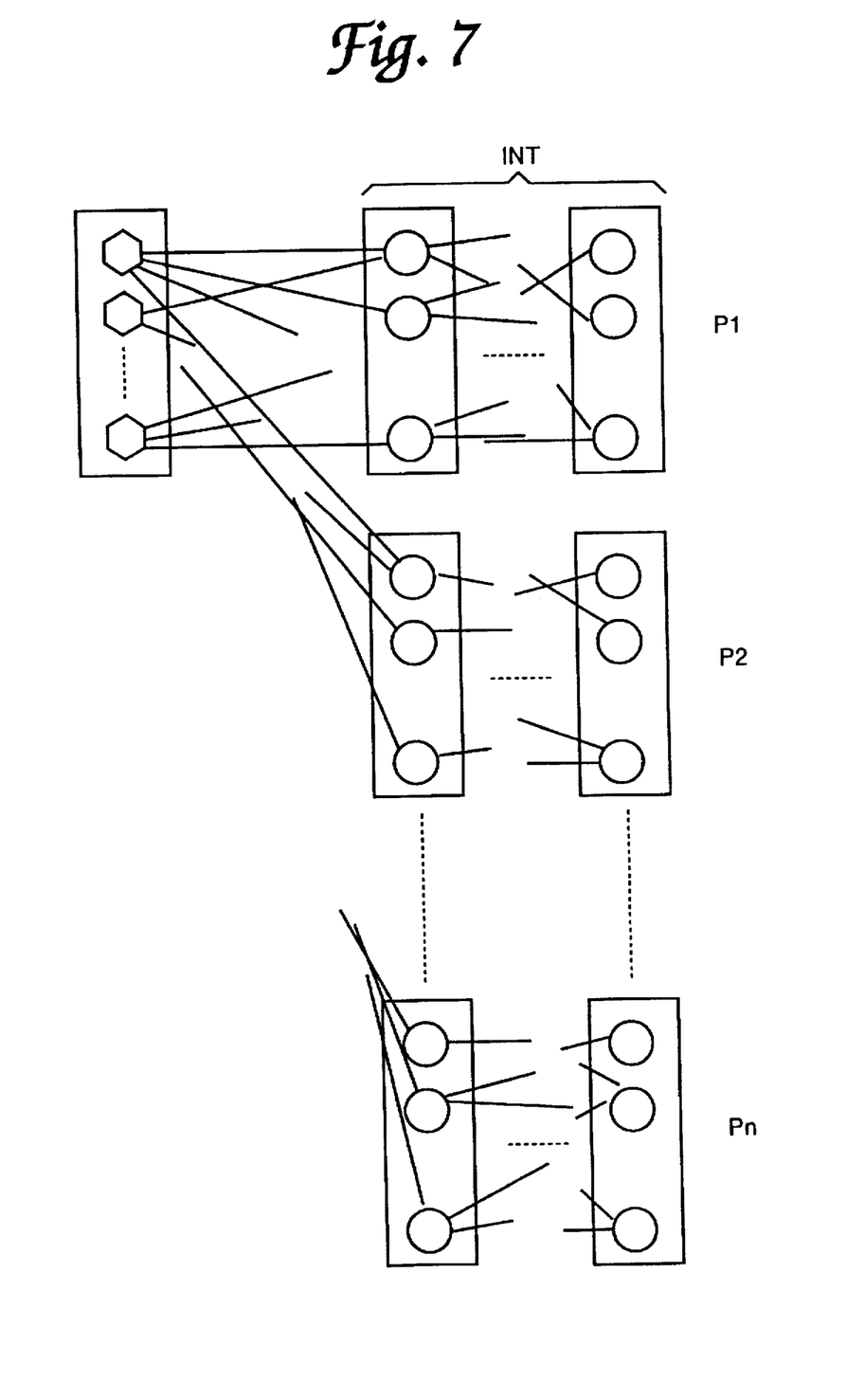
FIG. 7 shows a schematic diagram indicating a synthetic processing system at following column of neural processing system.

The determination is output whether corners and edges for each neural cell are extracted or not, according to the above processing. As shown in FIG. 7, this determination output is input to neural layer group INT for the unification. Data to be processed at this neural layer group INT is the one at higher degree and said neural layer. Neural layer group INT is composed with plural processing systems P1 to Pn, and each process system is constructed with plural number of neural layers. Processing systems P1 to Pn are classified by the shape of a configuration, for example; P1: triangle, P2: rectangle, Pn: a polygon with (n+2) corners.

Figure 8:
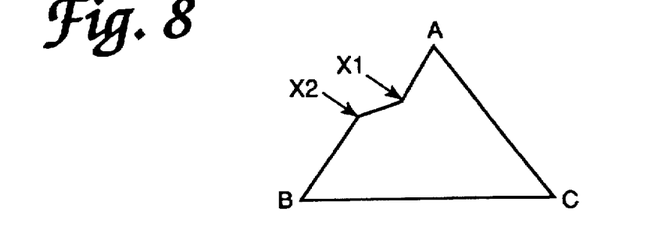
FIG. 8 shows a schematic diagram indicating a pseudo-corner of a configuration.

Output from said neural cell is the signal showing of existence of edges(hereinafter called "ES") and corners (hereinafter called "CS") inside the neural cell. There is the case when pseudo-corner X1 or X2 is appeared at side of a configuration as shown in FIG. 8, due to the noises or tolerance of the configuration itself, even though it is a single triangle.

According to the processing system for a triangle, such failed corner signal is removed and actual corner A, B and C are enhanced, so as to output the coordinate values. An embodiment of a neural network which performs the enhancement of corner A, B and C and the removal of the pseudo-corner is shown in FIG. 9.

Figure 9:
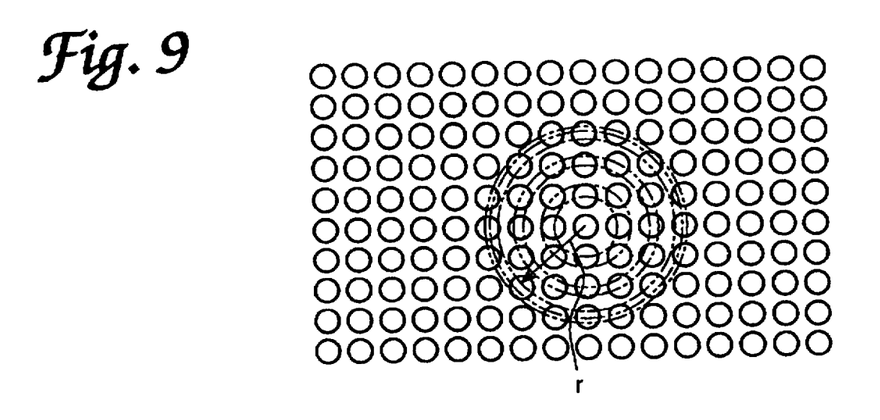
FIG. 9 shows a schematic diagram indicating the relationship between neurons by the second dimensional location.

Neurons corresponding to said neural cell are included in the neural network in FIG. 9. Each neuron is connected to all neural cell NC as neuron 21 in FIG. 3. Weight of each neuron is;

the maximal as compared with input of corresponding neural cell CS, the negative weight whose absolute value is the largest as compared with neural cell surrounding to corresponding neural cell, heightened its weight as the distance from corresponding neural cell becomes larger. The above relationship is described in FIG. 10 by the second dimensions.

Figure 10:
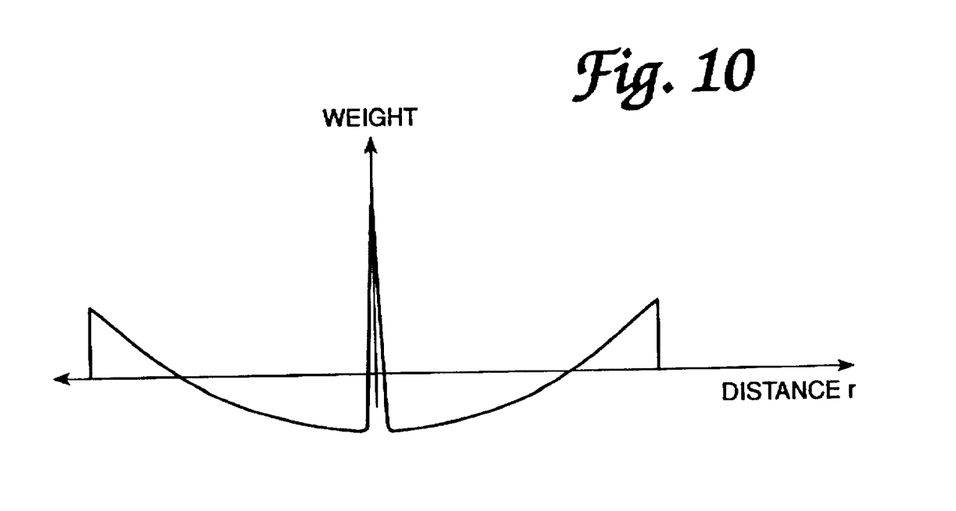
FIG. 10 shows a graph indicating the relationship between neurons by distance and weight.

According to the above structure, corner signal of appeared pseudo-corner during the processing is weakened, and corner signal of corner A, B and C is enhanced. The graph in FIG. 10 shows the approximation curve of a second degree indicating the relationship between distance and weight. Needless to say, adaptation of a monotonous increasing curve is also possible.

According to Perceptrons introduced by Rosenblatt, the structure for the performance of edge enhancement of ignition pattern is proposed, by giving the control-type-connection to feed back system from reaction layer to integration layer. However, there is no suggestion whatsoever, with regards to feed forward control-type-connection for the corner enhancement of specific configuration.

A data to be given to each processing system of neural layer INT is an abstracted data at neural cell and can be said that is a data at high degree. It is possible to input data to neural layer group INT, directly, when the image processing system, enable of extracting corner and edge data, is used as an input system. It is possible to heightened the neuron efficiency by inputting data at high degree, corner for example, to the neural layer at following column, when image data and characteristics data, corner for example, is confused. It is possible to calculate the minimum number of neural layers so as to achieve expected objective results, by calculating the difference of the degrees between final data to be output and first data to be input to neural layer.

Therefore, the present invention has advantages below.

(1) A predetermined processing is certainly performed according to the following assumption; the higher the abstraction of output data is, the more the number of neural layer becomes.

(2) Each neural cell is divided and data to be input to neural cell is output after it is processed in parallel; that is data is processed independently on after another. Therefore, a predetermined processing is certainly performed due to the fact that a heterogeneous data is never processed by processing system since input data according to a data processing system is processed individually after being classified with respect to the sorts or the character.

Hereinafter, an embodiment of the data processing system according to the present invention is described with referring to the attached drawings. The data processing system has the basic unit of the circuit shown in FIG. 13. The circuit in FIG. 13 comprises normalizing circuit 101, closed circuits for outputting 102 and 102'. Normalizing circuit 101 is a resonance system, comprising a closed circuit 103 for inputting, inductance L1 for inputting, capacitance CI for outputting and resistance RI. Induced electromotive force EI is generated in closed circuit 103 for inputting by mutual inducing action between closed circuit 103 and closed circuit 102. Capacitance CI for outputting is charged by induced current II generated by the induced electromotive force EI in closed circuit 103: consequently, potential difference is generated on opposite terminals of CI. Switching circuit 4 includes a transistor TR, whose base and corrector are connected to opposite terminals of capacitance CI, respectively. When a forward voltage Vbe between a base and emitter of the transistor TR exceeds the breaking range of TR, TR becomes conductive. A collector voltage Vcc is loaded on the collector of TR, the emitter of transistor TR is earthed through inductance 105 for outputting. Closed circuit 103 for inputting and transistor TR are connected with each other through diodes D1 and D2 which have the function of commutation in forward direction so as to prevent the transistor TR from reversed bias. When transistor TR is conductive, emitter current Ie is generated, which flows through inductance 105 for output.

Figure 13:
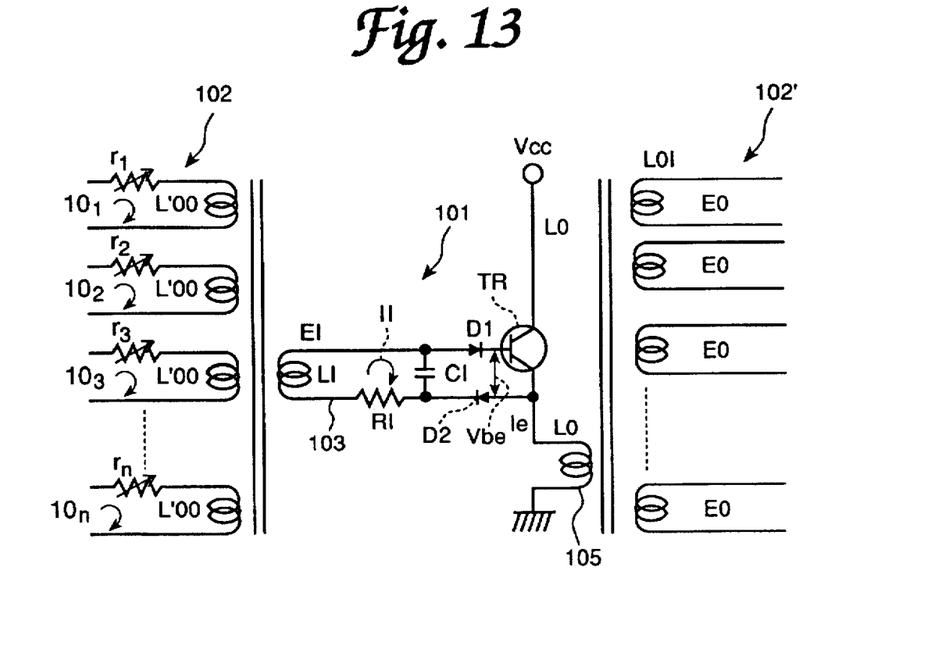
FIG. 13 shows the circuit with the structure of basic unit in the first embodiment of a data processing system according to the present invention.

Inductance 105 is connected magnetically with a plurality of closed circuit 102' for outputting. Induced electromotive force EO is generated in each closed circuit 102' by mutual inducing action between inductance 105 and each closed circuit 102'.

Figure 14:
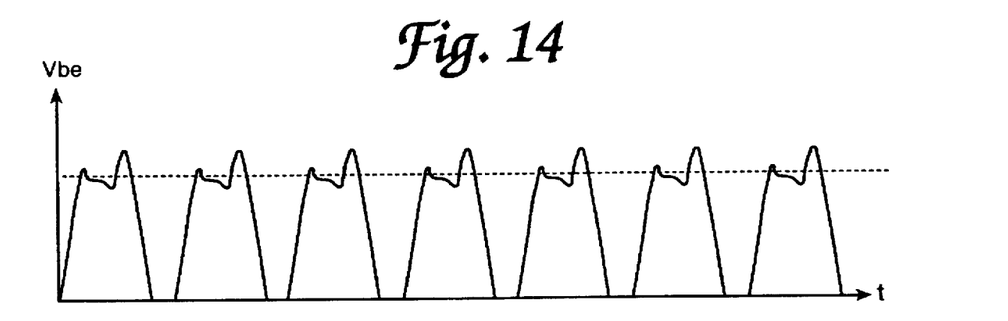
FIG. 14 is a diagram showing voltage between base and emitter of transistor in the first embodiment.

As shown in FIG. 14, closed circuits 102 and 102' comprise inductance LOI for inputting, inductance LOO for outputting and variable resistance r. The induced electromotive force EO is generated by mutual inducing between inductance LOI for inputting and inductance LO for outputting of normalizing circuit 1. Output current IO is generated by the induced electromotive force EO in closed circuit 102' for outputting: simultaneously, the induced electromotive force EI is generated by mutual inducing action between inductance LOO for outputting and inductance LI for inputting in closed circuit 101 for inputting 1. Potential difference Vci generated in capacitance CI by induced electromotive force EO is as follows.

$$Vci = \frac{1}{CI} \int II dt \quad (1)$$

The electromotive force generated in each closed circuit 102 for output is assumed to be Vi (i is from 1 to n), and Vi is assumed as in formula (2).

$$Vi = Voi \sin(\omega t + Si) \quad (2)$$

where, ω is the resonance angle frequency common to all closed circuits 102 band 102' for outputting and closed circuit 103 for inputting. That is, all closed circuits have the common resonance frequency. The attenuation is minimized, during the transmission of electrical signal from closed circuit 103 for outputting to normalizing circuit 1 and the transmission of electrical signal from normalizing circuit 101 to closed circuit 102' for outputting, because of the common resonance frequency. Assuming the resistance value of variable resistance r in i-th closed circuit for outputting 2 to be ri, the current IOi generated in the closed circuit for outputting can be calculated from formula (2), then the formulae below can be obtained.

$$V_i = (LOI + LOO)\frac{dIO_i}{dt} + r_i IO_i (LOI + LOO)\frac{dIO_i}{dt} + r_i OI_i \quad (3)$$
$$= V_{oi} \sin(\omega t + Si)$$

$$IO_i = \{V_{oi}/\sqrt{r_i^2 + \omega^2(LOI+LOO)^2}\} \sin(\omega t - \theta i) \quad (4)$$

$$\theta i = -\tan^{-1}\{\omega(LOI+LOO)/ri\} \quad (5)$$

Induced electromotive force EI in closed circuit 103 for inputting is expressed in formula (6), assuming that the mutual inductance is M between inductance LOO for outputting in closed circuit 102 for outputting and inductance LI for inputting in closed circuit 103 for inputting, and assuming that Γ equal to Co ∊o μo (Co is light speed in vacuum, εo is dielectric constant in vacuum of rational units, μo is magnetic permeability in vacuum of rational units).

$$EI = -\frac{M}{\Gamma^2} \sum_i \frac{dIo_o}{dt} \quad (6)$$

$$= -\frac{\omega M}{\Gamma^2} \sum_i \frac{VO_i \cos(\omega t - \theta i)}{r_i^2 + \omega^2 (LOI + LOO)^2} \quad (7)$$

Therefore, the current shown below is generated in closed circuit for inputting.

$$LI\frac{dII}{dt} + RI \cdot II + \frac{1}{CI} \int II dt = -\frac{\omega M}{\Gamma^2} \sum_i \frac{VO_i \cos(\omega t - \theta i)}{r_i^2 + \omega^2 (LOI + LOO)^2} \quad (8)$$

$$II = \frac{\omega^2 M}{\Gamma^2 \sqrt{RI^2 + \left(\omega LI + \frac{1}{\omega CI}\right)^2}} \times \sum_i \frac{VO_i \cos(\omega t - \theta i)}{r_i^2 + \omega^2 (LOI + LOO)^2} \quad (9)$$

Substituting (9) into (1), formula (10) is obtained.

$$VC_i = -\frac{\omega M}{\Gamma^2 CI \sqrt{RI^2 + \left(\omega LI + \frac{1}{\omega CI}\right)^2}} \times \quad (10)$$

$$\sum_i \frac{VO_i \cos(\omega t - \theta i)}{\sqrt{r_i^2 + \omega^2 (LOI + LOO)^2}}$$

Accordingly, Vbe is expressed as in formula (11).

$$Vbe = |Vci| \quad (11)$$

$$= \frac{\omega M}{\Gamma^2 CIZI} \sum_i \frac{VO_i \cos(\omega t - \theta i)}{ZO_i}$$

$$ZI = \sqrt{RI^2 + \left(\omega LI + \frac{1}{\omega CI}\right)^2}$$

$$ZO_i = \sqrt{r_i^2 + \omega^2 (LOI + LOO)^2}$$

Figure 15:
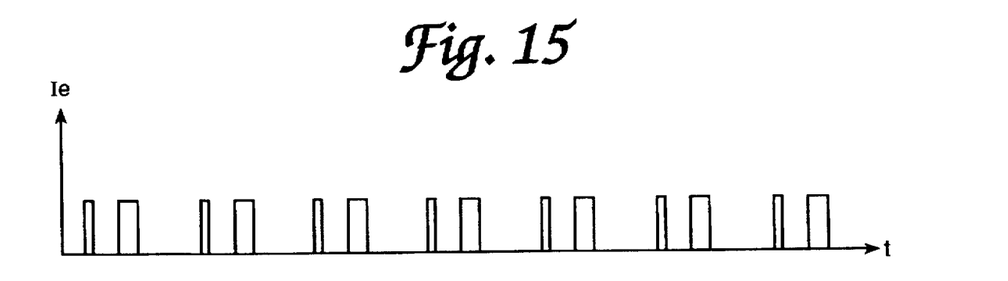
FIG. 15 is a diagram showing current of emitter of transistor in the first embodiment.

Supposing that Vbe has a characteristics shown in FIG. 14 (solid line) and that the breaking range of transistor TR is the level of broken line in FIG. 14, emitter current Ie is generated only when Vbe exceeds the broken line as shown in FIG. 15.

Induced electromotive force below is generated in each closed circuit 102' by emitter current Ie.

$$Eo = -\frac{M}{\Gamma^2} \cdot \frac{dIe}{dt} \quad (12)$$

Figure 16:
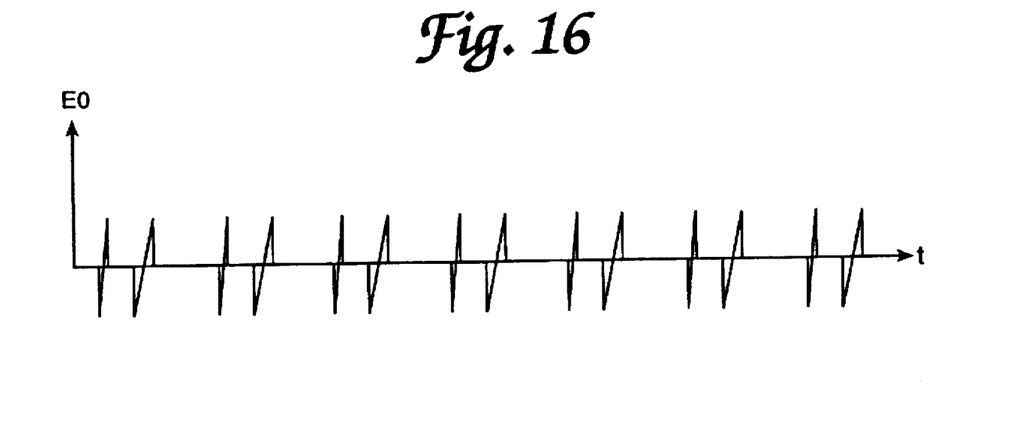
FIG. 16 is a diagram showing induced electromotive force of closed circuit for outputting in the first embodiment.

FIG. 16 is a diagram showing induced electromotive force Eo by generated emitter current in FIG. 15.

Figure 17:
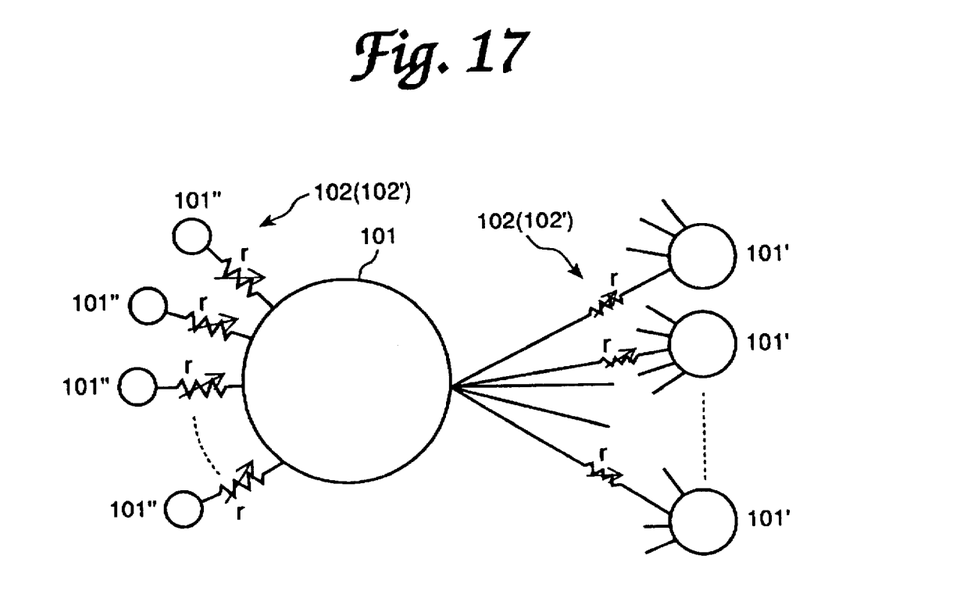
FIG. 17 is a diagram showing a connection of normalizing circuits.

As described above, normalized circuit 101 can execute threshold processing based on switching characteristics. As shown in FIG. 17, any outputs of normalizing circuit 101 can be inputted to other normalizing circuits 101' by closed circuit 102 (102') for outputting, and simultaneously, the outputs of other normalizing circuits 101" can be inputted to a normalizing circuit 101 by closed circuit 102 (102') for outputting. Therefore, network can be regenerated, and it is possible to settle a weight of synapse in the network by adjusting variable resistor r in closed circuit 102 (102') for outputting.

Figure 18:
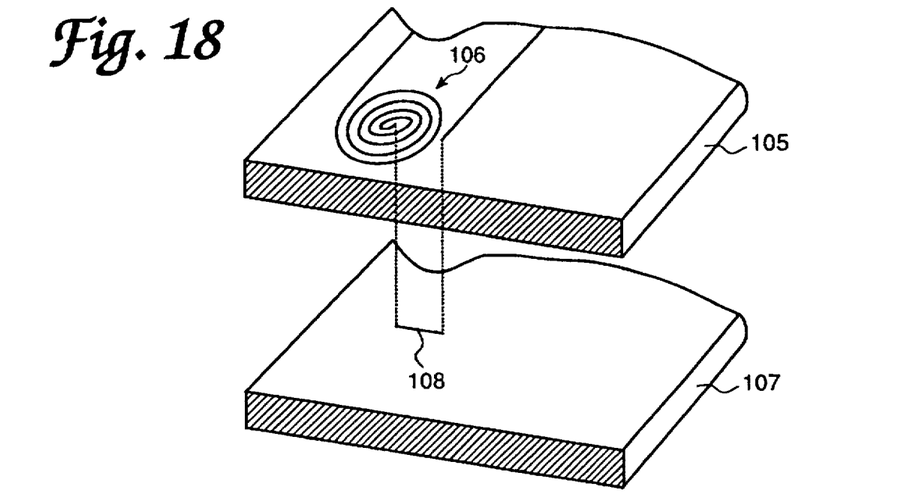
FIG. 18 is a perspective view of inductance in an IC.
Figure 19:
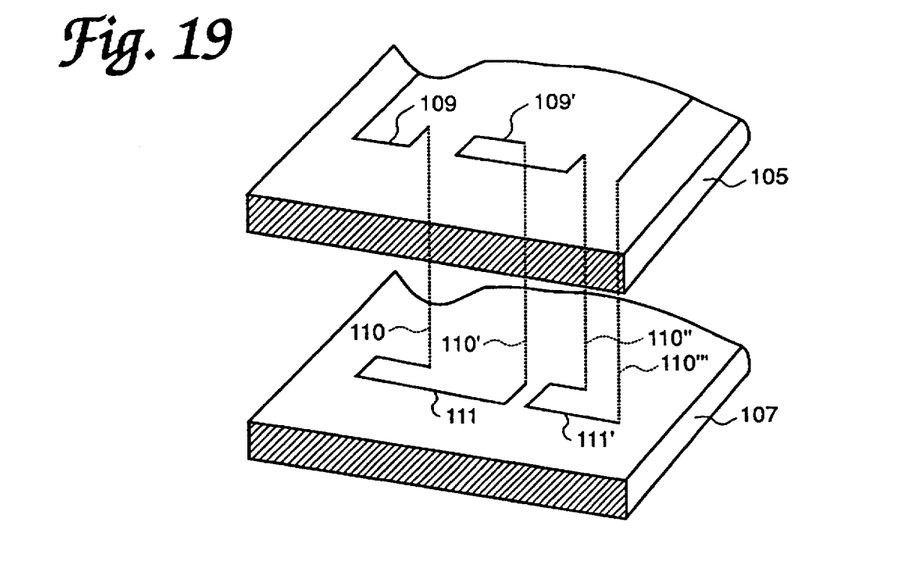
FIG. 19 is a perspective view of another inductance.
Figure 20:
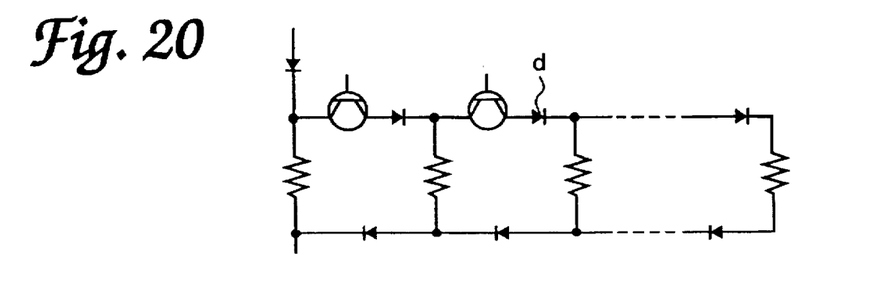
FIG. 20 shows a circuit of a form of changeable resistance in and IC.

When inductances are constructed in IC of normalizing circuit 1 and closed circuits 102 and 102' for outputting, a construction in FIG. 18 or FIG. 19 can be applied.

In FIG. 18, insulator 108 is formed, which performs as:

i) Forming spiral conductor 106 on the first insulator 105, and ii) Penetrating the first insulator 105 from the center of conductor 106, through insulator 105, pass the second insulator 107 and back again on the first insulator 105.

Current can be generated in insulator 106 and inductance can be realized by such structure.

In FIG. 107, insulator 110 and hooked insulator 111 are formed. Insulator 110 performs as:

i) Forming hooked conductor 109 on the first insulator 5, ii) Penetrating the first insulator 105 from and end of conductor 109, through insulator 105, reach the second insulator 107.

Hooked insulator 111 is connected to insulator 110. Circular circuit is constructed by hooked conductors 109 and 111 in such a structure, and inductance can be realized. It is possible to realize laterally expanded inductance by connecting conductor in the order of 109, 111, 109', 111', . . . on generating a plurality of hooked conductors (109, 109') on conductor 105 and generating a plurality of hooked conductors (111, 111', . . . ) on insulator 107. Variable resistance r can be realized by the structure in FIG. 8 which is connected parallelly through diode d and transistor.

Advantages of the Present Invention

As mentioned above, the data processing system according to the present invention has;

advantages of efficiency as well as faculty to achieve expected objective results, since the number of neural layers is equal to the number corresponding to the abstraction difference between output data and input data, the structure of at least 2 neural layers are divided into a plurality of neural cells each of which includes at least one neuron, and a neuron included in each neural cell is not connected to the neuron of other neural cells; therefore, a predetermined processing is certainly performed because heterogeneous data are never processed in one neural cell but processed in parallel and independently from one another.

Furthermore, a data processing system according to the present invention drives the resonance system for inputting connected to switching circuit by which the resonance system for outputting is driven. It is possible to possess the number of neurons for practicing, since it is possible to realize neural network with the function of normalization by analog circuit.

What is claimed is:

1. A neural network system comprising:

an image scanning device generating lightness measurements of pixel areas of an image;

a plurality of neural cells, each cell comprising a plurality of neural layers connected in series, each layer comprising a plurality of neural processing elements, each neural processing element generating an output when a weighted sum of inputs exceeds a threshold;

wherein a first neural layer of each neural cell receives, as inputs having a given degree of abstraction, lightness measurements from a finite region within an image;

wherein processing of an input in the neural layers changes the degree of abstraction of the input; and wherein the minimum number of neural layers is equal to the difference between the degree of abstraction of an output and the degree of abstraction of the input.

2. The system of claim 1 wherein an output of a neural processing element of a first layer of a neural cell connects to an input of each neural processing element of a second layer of the cell.

3. The system of claim 1 wherein each output of each neural processing element of a first layer of a cell connects to an input of each neural processing element of a second layer of the cell.

4. The system of claim 1 wherein neural layers of a cell are connected sequentially, and outputs of neural processing elements of each neural layer of the cell connect to inputs of neural processing elements of a subsequent neural layer of the cell.

5. The system of claim 4 wherein the inputs of neural processing elements of each neural layer have the same degree of abstraction.

6. The system of claim 1 wherein each neural processing element of a first layer of a neural cell receives, as inputs, lightness measurements from a multi-pixel region within an image.

7. The system of claim 1 wherein the neural processing elements are connected to other neural processing elements only within the same cell such that data transmission is performed only within the cell.

8. The system of claim 1 wherein processing of the inputs in each neural layer increases the degree of the abstraction of the inputs by one degree such that the number of neural layers is equal to the degree of abstraction of the output minus the degree of abstraction of the input.

* * * * *